United States Patent [19]
Sigler

[11] Patent Number: 5,862,001
[45] Date of Patent: *Jan. 19, 1999

[54] NON-DEVIATING PRISM WITH CONTINUOUSLY VARIABLE DISPERSION

[75] Inventor: Robert D. Sigler, Cupertino, Calif.

[73] Assignee: Lockheed Missiles & Space Company, Inc., Sunnyvale, Calif.

[ * ] Notice: The term of this patent shall not extend beyond the expiration date of Pat. No. 5,610,771.

[21] Appl. No.: 664,133

[22] Filed: Jun. 14, 1996

Related U.S. Application Data

[62] Division of Ser. No. 283,561, Aug. 1, 1994, Pat. No. 5,610,771.

[51] Int. Cl.$^6$ ............... G02B 5/04; G02B 7/18; G02B 1/06; G02B 26/08

[52] U.S. Cl. ............ 359/832; 359/831; 359/665; 359/737; 359/211

[58] Field of Search ............ 359/832, 831, 359/665, 737, 211

*Primary Examiner*—Cassandra C. Spyrou
*Assistant Examiner*—Mohammad Y. Sikder
*Attorney, Agent, or Firm*—Fenwick & West LLP

[57] ABSTRACT

A non-deviating prism system (40) and method provides continuously variable dispersion of light with limited deviation. Light is dispersed in a prism arrangement which includes a selected liquid filled in the spaces between adjacent prism elements (41, 51). The indices of refraction and the apex angles of the prisms (41, 51) and the intervening liquid are set to limited deviation according to predetermined relationship. The prisms are mounted near the edges of mutually insertable tubes (62, 64) and a refractive liquid is secured in a containment space bounded by the prism elements (41, 51).

2 Claims, 4 Drawing Sheets

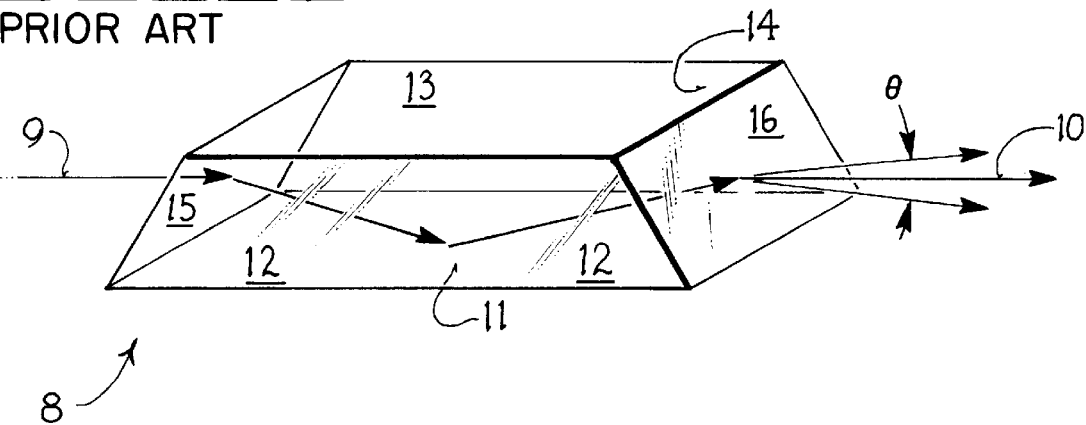
FIG_1
PRIOR ART
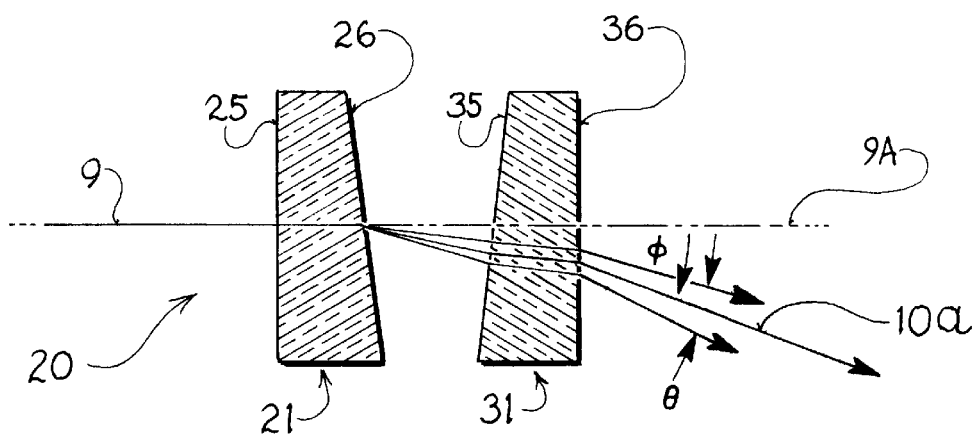
FIG_2A
PRIOR ART
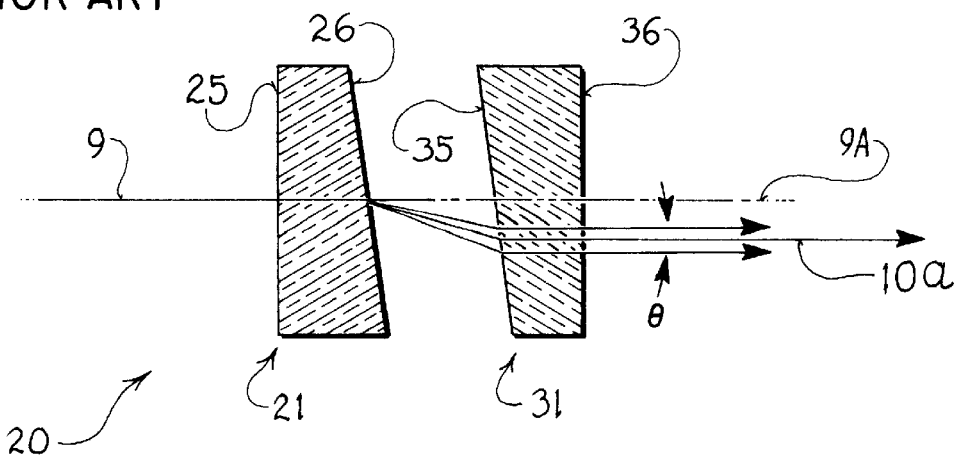
FIG_2B
PRIOR ART

FIG_3A
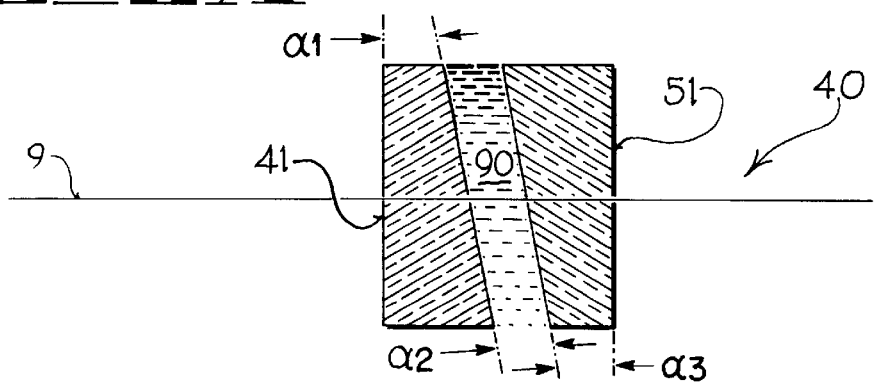
FIG_3B
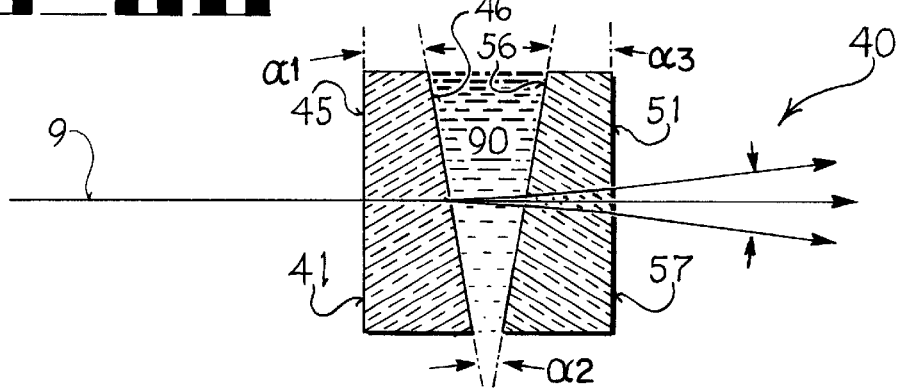
FIG_6
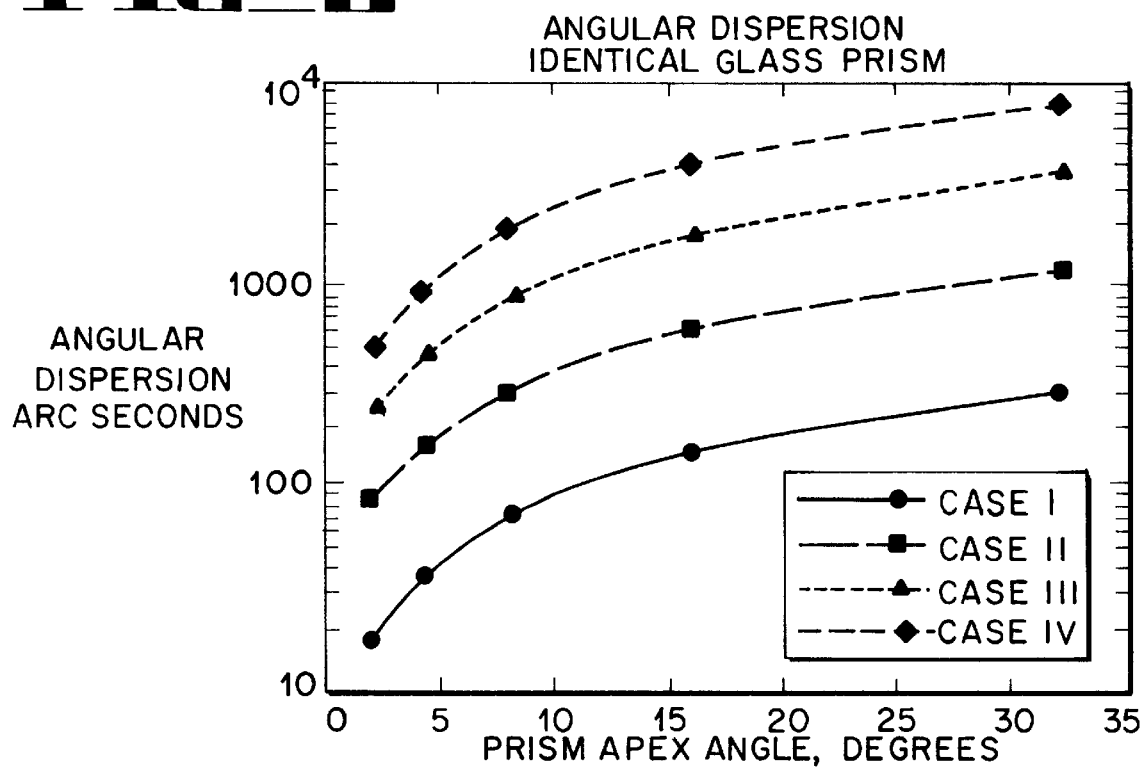

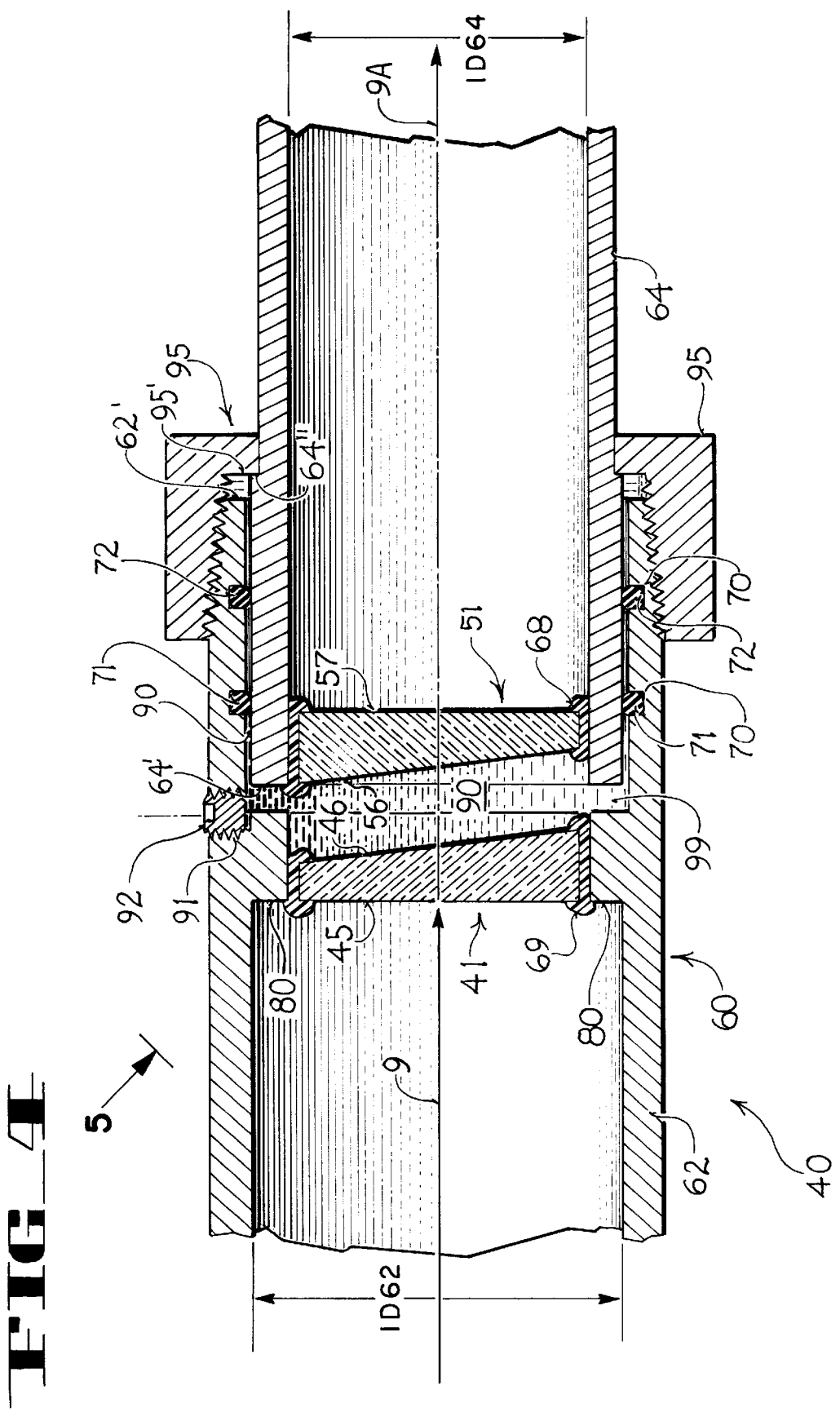

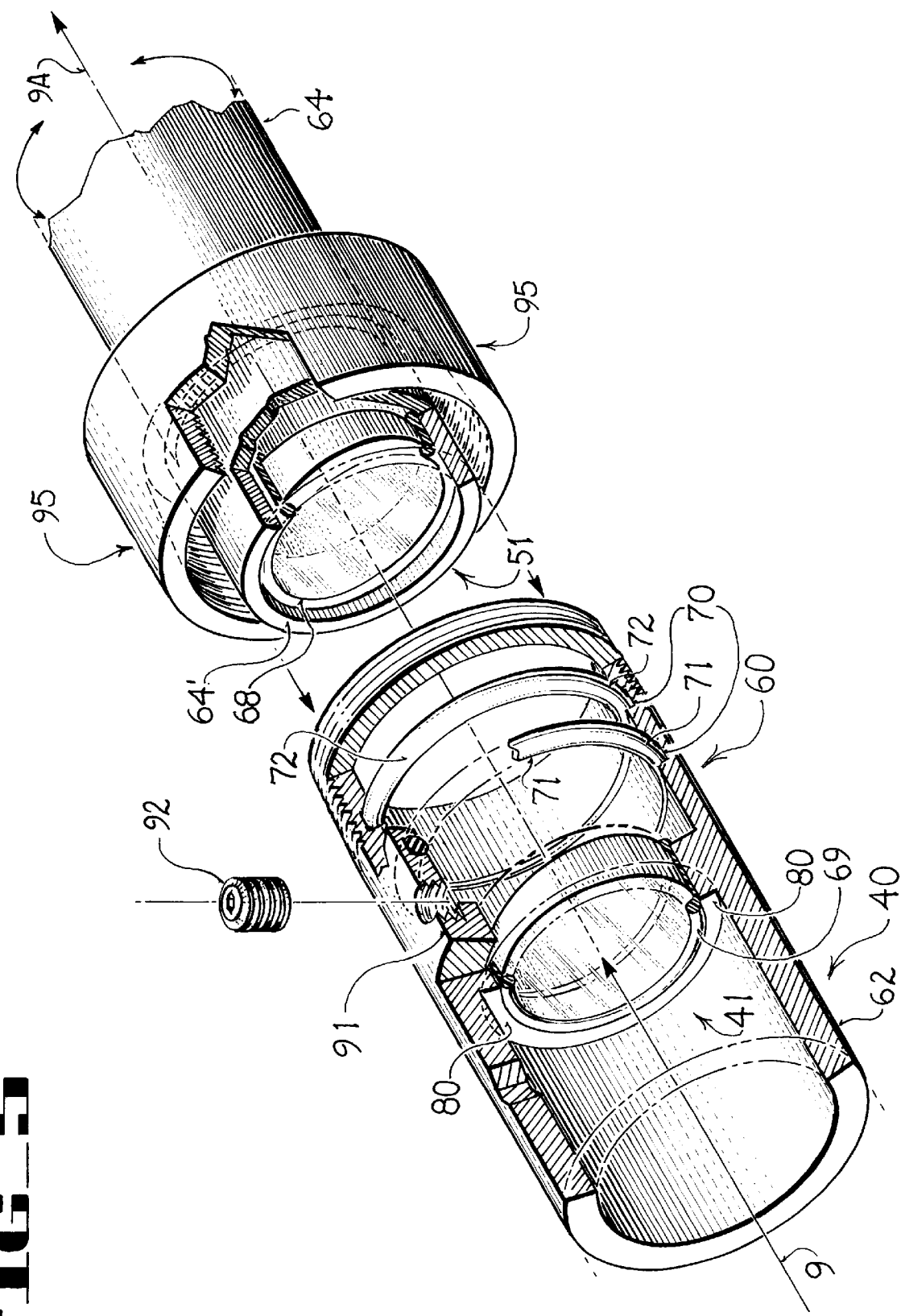
FIG_5

# NON-DEVIATING PRISM WITH CONTINUOUSLY VARIABLE DISPERSION

This is a divisional application of U.S. patent application Ser. No. 08/283,561 filed Aug. 1, 1994, now U.S. Pat. No. 5,610,771.

TECHNICAL FIELD

This invention relates to optical systems and having continuously variable dispersion characteristics, and more particularly to an arrangement of glass and liquid prisms which exhibit continuously variable chromatic dispersion without deviation.

BACKGROUND OF THE INVENTION

Non-deviating prisms are known. Such prisms are also known as direct view prisms. These prisms produce a fixed quantity of chromatic dispersion determined by the prism's geometry and the chromatic dispersion properties of the prism materials. One example of a non-deviating prism arrangement is the Dove prism. This type of prism is frequently used as an image rotator in a variety of opto-mechanical systems. An image passing through a dove prism will be rotated at twice the angular rate of rotation of the dove prism itself. The rotated image passes through the dove prism without angular deviation at some nominal wavelength (usually the center of the spectral band of interest) but does experience chromatic dispersion over the spectral band (e.g. the visible spectrum).

Chromatic dispersion is the separation of polychromatic light (i.e. white light) into its chromatic components (i.e. colors) by passage through a refractive element such as a prism. This is caused by the interrelationship between the index of refraction of the prism materials, the prism geometry and the frequency (or wavelength) of the light passing through the prism.

Certain kinds of variable dispersion prism arrangements are also known. One variable dispersion prism arrangement consist of a pair of rotatable prisms wedges. Unfortunately, all known variable dispersion prism arrangements also introduce a deviation (i.e. change in angle) of the nominal optical path. This deviation is typically much larger than then the total induced chromatic dispersion. It would be beneficial to have a prism arrangement which permits continuously variable chromatic dispersion without deviation of the nominal optical path. An example of how such a device would prove beneficial relates to the correction of atmospheric induced chromatic dispersion such as that encountered in terrestrial telescopic viewing of astronomical objects that are located close to the horizon.

The curvature of the Earth's atmosphere and its optical properties induces chromatic dispersion in the image of a star or planet that is proportional to the object's elevation angle above the local horizon. Due to the rotation of the earth, the elevation angle of an astronomical object is constantly changing with time (except for objects located at the celestial pole or objects viewed from the Earth's equatorial pole). Therefore, the amount of induced atmospheric dispersion also changes constantly. A commonly used prism arrangement for correcting this atmospheric dispersion is a pair of air-spaced, rotatable, wedge prisms located ahead of either the telescope objective or the telescope eyepiece. As noted above, this prism arrangement also produces substantial deviation of the nominal optical path. This angular deviation causes the image to be displaced laterally at the telescope's image plane and can even cause the image being corrected to pass out of the eyepiece's field of view. Thus, as the dispersion correction is adjusted, the telescope tracking must also be constantly adjusted to recenter the object in the field of view.

Accordingly, it is desirable to produce a variable amount of chromatic dispersion unaccompanied by deviation or at least a deviation which is very small compared to the chromatic dispersion.

SUMMARY OF THE INVENTION

The present invention is directed toward a prism system (40) and method which may eliminate deviation in the nominal optical path (9) while permitting a continuously variable dispersion. According to one version of the present invention, the prism system (40) developed is compact, contains a central liquid volume and has prism entrance and exit faces which are substantially normal to the optical path. Having normal faces greatly reduces induced off-axis aberrations such as coma, astigmatism, and lateral color. In a preferred version of the invention, the index of refraction of the glass prisms (41, 51) and the central liquid are substantially identical at some nominal wavelength (usually the center of the spectral band of interest—green or yellow for the visible spectrum). Because the liquid is closely matched in index with the surrounding glass prism faces, these surfaces have relaxed fabrication and surface quality tolerances and also do not need anti-reflection coatings for maximum optical transmission. The non-deviating prism system (40) according to the present invention further maintains a constant liquid volume irrespective of rotation angle between the surrounding glass prisms (41, 51). While the nominal index of the glasses and the liquid comprising the prism assembly may be substantially the same, the dispersion properties of the glasses and liquids are quite different. Thus, when one glass prism wedge is rotated about the optical axis relative to the adjacent glass prism (with the space between them filled with an optical liquid that has a very different dispersive nature), a variable geometry liquid "prism" is created. The combination of the variable geometry liquid prism and the adjacent glass prisms produces net chromatic dispersion that can be varied from zero to a specific maximum value with little or no net deviation of the nominal optical path or ray.

According to the present invention, an arrangement and method for variably dispersing light without deviation is provided which includes a first glass prism (51) having first and second faces (45, 46) angled with respect to each other so as to form a specific apex angle. The arrangement of the invention further includes a second glass prism (51) having third and fourth faces (56, 57) which may be angled with respect to each other at substantially the same apex angle as the first glass prism. The second glass prism is axially rotatable with respect to said first prism. Further, the arrangement according to the invention includes a selected liquid contained between the first and second glass prisms. The index of refraction at the nominal wavelength may be substantially identical for the glass prisms and the liquid. The dispersion properties of the glass prisms may be substantially the same, but is quite different from that of the liquid. Finally, the outwardly directed faces of the glass prisms may be substantially parallel and normal to the optical path regardless of the relative rotation angle between the glass prisms. When the inwardly directed faces (46, 56) of the glass prisms are parallel, the net chromatic dispersion is substantially zero. The net chromatic dispersion is maximized by rotating the second glass prism by 180 degrees from the minimum dispersion setting.

The arrangement according to the invention may be applied practically as an atmospheric dispersion compensator for earth-based astronomical observations, or in any other application where variable chromatic dispersion without substantial attendant angular deviation is advantageous.

BRIEF DESCRIPTION OF THE DRAWINGS

FIG. 1 shows an isometric view of a dove prism of the prior art. This prism transmits light rays with zero deviation (i.e. the nominal ray is neither displaced nor deviated in angle by passage through the prism). The light rays are however, chromatically dispersed by a fixed amount by passage through the prism;

FIGS. 2A and 2B shows a variable dispersion prism arrangement of prior art in cross-sectional views. This arrangement is known as a rotating wedge prism pair. The dispersion of this arrangement is varied by rotating one prism relative to the other. The chromatic dispersion produced is accompanied by considerable deviation of the nominal optical path (i.e. the angular deviation of the nominal ray is larger than the angular chromatic dispersion produced between two well separated wavelengths (e.g. the red and blue ends of the visible spectrum);

FIGS. 3A and 3B shows a cross-sectional view of the glass-liquid prism according to the present invention, in two angular settings which correspond to the zero dispersion position and the maximum dispersion position respectively;

FIG. 4 shows in partial cross-section view of the non-deviating glass-liquid prism system according to one version of the present invention;

FIG. 5 shows an exploded, cut-away view of the glass-liquid prism system of the present invention shown in FIG. 3; and FIG. 6 is a graph of angular dispersion (measured from red to blue light) for several different combinations of glasses and liquids as a function of prism apex angle. In each case the glass prisms are made of the same material and the liquid is selected so as to maximize the chromatic dispersion while ensuring zero deviation of the nominal light in accordance with a version of the present invention.

DETAILED DESCRIPTION OF THE PREFERRED EMBODIMENTS

FIG. 1 shows an isometric view of a dove prism 8 of the prior art, which can transmit light with zero deviation and fixed amount of chromatic dispersion. Light entering the prism 8 along its optical axis 9 and is preferably parallel or collimated. More particularly, dove prism 8 includes six surfaces, respectively surfaces 11–16. The lateral surfaces of the prism (i.e., surfaces 11–14) are parallel to optical axis 9. Lateral surface 11, is referred to as the hypotenuse face. Light transmitted by the prism is incident on the hypotenuse face at such a shallow angle as to totally internally reflected. Surfaces 15 and 16 are the input and output faces of the prism.

The construction of the dove prism ensures that ray 10a representing a nominal color or wavelength is transmitted without displacement or angular deviation. An incident polychromatic ray 9 is transmitted by the prism with chromatic angular dispersion about the nominal ray path 10. The angular spread of the dispersed light associated with a spectral band is denoted by dispersion angle $\theta$. Dispersion angle $\theta$ is fixed by the prism geometry, the material employed and the spectral bandwidth of the transmitted light. Rotation of the Dove prism about the optical axis will rotate a transmitted image but the deviation will remain zero and the dispersion angle will be unchanged.

FIGS. 2A and 2B shows in respective cross-sectional views, different settings of a variable dispersion, non-zero deviation optical system 20 of the prior art. Optical system 20 is an arrangement for variably dispersing light which includes a first prism 21 having first and second optical surfaces 25 and 26. Surfaces 25 and 26 are tilted with respect to each other at a predetermined apex angle. Optical system 20 further includes a second prism 31 having third and fourth optical surfaces 35 and 36 which are tilted with respect to each other at a second predetermined angle. Second prism 31 is axially rotatable with respect to said first prism 21 along the same optic axis. Typically, prisms 21 and 31 are identical so they have the same apex angles and the same index of refraction and dispersion properties.

FIG. 2A shows the variable prism system 20 configured for maximum dispersion. The maximum deviation setting is established by rotation of prism 31 so as to maximize the angular difference between surfaces 26 and 35. This results in a non-zero deviation angle $\phi$ between the mechanical axis 9a and the nominal ray 10a. The angular dispersion is given by Theta, as before.

FIG. 2B shows the same prism arrangement 20 arranged for minimum chromatic dispersion by having surfaces 26 and 35 parallel to each other. Because of the axial separation between prisms 21 and 31, there is a transverse offset that it proportional to wavelength between the mechanical axis 9a and the nominal ray 10a. The deviation of the nominal ray $\phi$ and angular chromatic dispersion $\theta$ are minimized. Because of the axial separation between first and second prisms 21 and 31, there is a transverse offset between the hypothetical output ray 9a and the actual nominal output light beam 10. However, there is no angular deviation $\phi$.

FIGS. 3A and 3B show in respective side-cross-sectional views, different settings of a variable dispersion system according to one version of the present invention. The version shown is a variable dispersion prism assembly with identical glass prisms. In particular, FIG. 3A shows variable dispersion optical system 40 with prisms 41 and 51 rotated relative to each other about axis 9 to minimize dispersion. FIG. 3B shows variable dispersion optical system 40 with prisms 41 and 51 rotated relative to each other to minimize dispersion. In both cases, the liquid in space 90 is selected to match the material of prisms 41 and 51 to ensure zero deviation. The matching performed in this version relates to matching indices of refraction. The apex angles of prisms 41 and 51, respectively $\alpha_1$ and $\alpha_3$, are set equal to each other. The angle of the central liquid element in space 90, i.e., angle $\alpha_2$, is variable between zero (0) degrees and $\alpha_1+\alpha_3$, which equals $2*\alpha_1$. $\alpha_2$ is zero when respective surfaces 46 and 56 of respective prisms 41 and 51 are parallel to each other. In each case, i.e., the rotational cases indicated in FIGS. 3A and 3B, the volume of liquid in space 90 is the same, except for minor volume variations due to ambient temperature changes.

Notably, the prisms 41 and 51 need not be identical in order to fall within the scope of the invention. The total angular deviation at a particular nominal wavelength (for example, the yellow D spectral line at 0.5893 microns) is given by the relationship, $$D = \sum_i^3 \alpha(N_{Di} - 1)$$

where

D is the deviation, $\alpha_1$, $\alpha_2$, and $\alpha_3$ are the angles of the respective lens elements as indicated above with respect to FIGS. 3A and 3B, and $N_{D1}$, $N_{D2}$, and $N_{D3}$ are the respective indices of refraction of the respective lens elements (solid or liquid) at the yellow or "D" spectral line at 0.5893 microns, $N_{D2}$ being the index of refraction of the liquid element between prisms 41 and 51.

As noted above, optical system 40 is an arrangement for variably dispersing light without significant deviation which includes a first prism 41 having first and second aperture surfaces 45 and 46 facing in different directions of first prism 41. Aperture surfaces 45 and 46 are skewed with respect to each other at a first predetermined angle, and first prism 41 has a first index of refraction. Optical system 40 further includes a second prism 51 having third and fourth aperture surfaces 56 and 57 which are skewed with respect to each other at a second predetermined angle. Second prism 51 has a second index of refraction which substantially matches the first index of refraction of the first prism 41. Matching for purposes of the patent application herein is considered to be the condition in which the apex angles of first and second prisms 41 and 51 in view of the matching liquid contained therebetween, and the respective indices of refraction of prisms 41 and 51 and the index of refraction of the matching liquid, are such that the deviation is less than a preselected level. If for example the selected deviation level is zero, i.e., "0," then the relationship, $$0 = \sum_{i}^{3} \alpha_i(N_{Di} - 1)$$

specifies the required prism angles and indices.

$\alpha_2$ is variable, because it inherently changes as prisms 41 and 51 are counterrotated. In the case of identical prism, $\alpha_1 = \alpha_3$ and $N_{D1} = N_{D3}$. Alternatively, $$D = \sum_{i}^{3} \alpha_i(N_{Di} - 1)$$

where "D" is a selected deviation level which is considered acceptable. For purposes herein, zero deviation includes the situation in which the actual deviation is less than the value of dispersion for a selected bandwidth of light. It is notable that for identical prisms where there is a mismatch between the indices of refraction between the solid and liquid lens elements, the apex angles and the material of the prisms being the same, the deviation will be represented by the following relationship:

$$d = 2\alpha_1(N_1 - N_2)$$

where:

$N_1$ and $N_2$ are the indices of refraction for the solid and liquid elements respectively.

The dispersion is expressed according to the following relationship:

$$d(F - C) = \sum_{i}^{3} \frac{\alpha_i}{V_i}(N_{Di} - 1)$$

where:

$\alpha_1$, $\alpha_2$, and $\alpha_3$, $N_{D1}$, $N_{D2}$, and $N_{D3}$ are defined as before, and $V_1$, $V_2$, and $V_3$ are respectively the reciprocal dispersion of the elements as defined immediately below. F and C denote blue and red spectral lines at 0.4861 and 0.6563 microns, respectively. Accordingly, d(C–F) means the dispersion between the blue and red spectral lines.

The reciprocal dispersion, $V_i$, is defined as:

$$V_i = \frac{N_{Di} - 1}{N_{Fi} - N_{Ci}}$$

where for i=1,2, and 3, $N_{Di}$ is defined as before, and $N_{Fi}$ and $N_{Ci}$ are the indices of refraction of the particular material or liquid respectively at the blue and red spectral lines as defined above.

The total dispersion, "d," is given by the following relationship:

$$d = 2\alpha_1(N_D - 1)\left(\frac{1}{V_1} - \frac{1}{V_2}\right).$$

FIG. 4 shows a partial cross-section of an optical system 40 according to one version of the present invention, and FIG. 5 shows an exploded cross-sectional view of the same version of the invention. In particular, FIGS. 4 and 5 show a side-cross-sectional view of a selected setting of the variable dispersion, zero-deviation or controlled deviation optical system 40 according to the invention. Optical system 40 is an arrangement for variably dispersing light without significant deviation or with controlled deviation which includes a first prism 41 having first and second aperture surfaces 45 and 46 facing in different directions of first prism 41. Aperture surfaces 45 and 46 are skewed with respect to each other at a first predetermined angle, and first prism 41 has a first index of refraction. Optical system 40 further includes a second prism 51 having third and fourth aperture surfaces 56 and 57 which are skewed with respect to each other at a second predetermined angle. Second prism 51 has a second index of refraction which according to one version of the present invention substantially matches the first index of refraction of the first prism 41, and second prism 51 is axially rotatable with respect to said first prism 41 along central optic axis 9.

Optical system 40 of the present invention includes a containment structure 60 having first and second rotatably coupled structures respectively 62 and 64 which respectively contain first and second prisms 41 and 51 and a selected refractively matching liquid in a containment space 99 between first and second prisms 41 and 51 as discussed further below. According to one embodiment of the present invention, containment structure 60 and first and second rotatably coupled structures 62 and 64 are tubular, with one of the two rotatably coupled structures having a diameter enabling the other of the rotatable coupled structure to be partially inserted therein without preventing axial rotation. First and second prisms 41 and 51 in FIG. 3 are mounted in laterally spaced, axially rotatable position with respect to each other inside containment structure 60.

When first and second rotatably coupled structures 62 and 64 are coupled and their respective edges are overlapping, the outer surface of one of them and the inner surface of the other will be closely engaged. However, a small difference in diameter may remain between the outer and inner surfaces. To seal the respective surfaces against each other and to prevent liquid transport between the two surfaces, one or the other or both of the cooperative surfaces may have defined therein one or more annular grooves for holding a sealing ring. According to an embodiment of the invention, optical system 40 includes first and second O-rings 71 and 72 mounted between the overlapping surface region of first and second rotatably coupled structures 62 and 64. O-rings 71 and 72 may be inserted to a sufficient extent in receiving groves 70 to permit adequate extension out of the respective groves to accomplish sealing operation and to bear sealingly against an opposing surface. The O-rings may for example be suitably dimensioned Viton rubber from Parker O-Ring. Viton rubber is essentially an inert fluorosilicone material. The rotatably coupled first and second structures 62 and 64 further define respective edges 62' and 64'.

First and second prisms 41 and 51 according to an embodiment of the present invention are securely mounted within respective first and second rotatably coupled structures 62 and 64, preferably at or near respective edges 62' and 64' thereof. In accordance with one version of the invention, prisms 41 and 51 are secured by emplacement in respective annular ridges 68 and 69 of inert flexible adhesive material such as fluorosilicone. One kind of fluorosilicone material which can be employed is type X36141 from Dow Corning of Midland, Mich. These flexible ridges allow for expansion of liquid in containment space 99 under a broad range of temperature fluctuations. Adhesive material 69, 68 respectively is applied to the respective inner diameter surfaces of rotatably coupled structures 62 and 64. According to one version of the present invention, respective prisms 41 and 51 are disk-shaped and substantially identical physically and in terms of optical characteristics such as refractive index. According to this version, prisms 41 and 51 have the same diameters. To enable preferred mounting, the larger inner diameter one of rotatably coupled structures 62 and 64 includes an inner diameter ridge 80 approximately to match the inner diameter of the smaller inner diameter one of rotatably coupled structures 62 and 64. Inner diameter ridge 80 is inwardly set from edge 62' of rotatably coupled structure 62 to define a sufficient end region of rotatably coupled structure 62 to overlap the other of rotatably coupled structures 64 to a sufficient extent to permit coupling and sealing therebetween.

According to one embodiment, edge 64' is not inserted into rotatably coupled structure 62 sufficiently to bear against inner diameter ridge 80. Instead, it is preferred that an annular gap 90 is established and maintained between ridge 80 and the edge 64' of rotatably coupled structure 64 to provide access to containment space 99 in which a selected refractively matched liquid is held. Further, according to one version of the invention, an aperture 91 is defined in rotatably coupled structure 62 to permit liquid ingress and egress. The position of aperture 91 is preferably adjacent to or partially overlapping with ridge 80 on its side nearest edge 62'. The direction of aperture 91 is radial. Aperture 91 may have threads machined therein for receiving a screw or bolt. Rotatably coupled structure 62 for example includes a screw 92 for sealingly closing aperture 91, according to one embodiment of the invention. Optical system 40 additionally includes a clamp 95 for securing rotatable coupled structures 62 and 64 axially, while permitting rotational freedom. Clamp 95 includes a radially inwardly extending flange 95'. The outer diameter of rotatable coupled structure 64 includes a raised annular portion 64" against which inwardly extending flange 95' bears to secure rotatable coupled structure 64. Clamp 95 may be threadably secured on the outer diameter of rotatable coupled structure 62, near its edge 62'. It could alternatively be secured by welding or soldering for example.

Rotatable coupled structures 62 and 64, first and second prisms 41 and 51, sealing ridges 68 and 69, and screw 92 define a containment space 99 between prisms 51 and 52 for enclosing a selected liquid of refractive properties substantially matching those of prisms 41 and 51. In particular, by being axially rotatable along optic axis 9 with respect to each other in an enclosure permitting light to pass therethrough, prisms 41 and 51 operating with a suitable matching liquid held therebetween are effective for enabling the adjustment of dispersion in multiwavelength light passing through prisms 41 and 51 parallel with their axes, while avoiding undesired deviation effects, such as transverse image displacement during dispersion adjusting. A suitable liquid for use in containment space 99 is Mil Spec 516379 liquid, in connection with prisms 41 and 51 preferably made of BK7 glass according to one version of the invention and having a prism apex angle of 3.87 degrees. As a result, output light beam 9a exits without deviation. With the indicated setting of prisms 41 and 51 so that faces 46 and 56 are parallel, there will be no dispersion. With a matching liquid in containment space 99, there is additionally no sidewards displacement.

Optical system 40 according to the present invention as shown in FIGS. 3 and 4 is set at a minimum dispersion, zero deviation setting, established, according to one version of the invention, by holding surfaces 45 and 57 parallel to each other and minimizing the angular deviation between surfaces 46 and 56. For BK7 glass, 516379 liquid, and an apex angle of 3.87 degrees, the maximum dispersion is 155 arc. sec. This will occur when prisms 41 and 51 are counterrotated at 180 degrees from the settings shown in FIGS. 3 and 4.

The angular dispersion for particular materials and liquids is plotted in FIG. 6 for identical glass prisms, as a function of prism apex angle in degrees. The angular dispersion is indicated in arc seconds. Plots are provided for four combinations of solid and liquid materials:

| Case No. | Source | Type | ND | VD |
|---|---|---|---|---|
| I | CORNING | Fused Silica | 1.457 | 67.8 |
|  | CARGILLE | 50350 | 1.457 | 56.7 |
| II | SCHOTT | BK7 | 1.516 | 64.1 |
|  | CARGILLE | SERIES A | 1.516 | 37.9 |
| III | SCHOTT | SK16 | 1.620 | 60.3 |
|  | CARGILLE | SERIES E | 1.620 | 23.3 |
| IV | SCHOTT | LAKN 6 | 1.642 | 57.9 |
|  | CARGILLE | EC31 | 1.642 | 13.5 |

In operation according to one embodiment of the invention for telescopically viewing stars or planets low in the horizon, where atmospheric dispersion is maximized because of the length of travel by received light through the curved atmosphere, it is clear that this invention permits the undesired atmospheric dispersion to be canceled out by suitably adjusting or counterrotating prismatic telescopic elements containing a matching liquid therebetween to produce a counterdispersion effect in accordance with the present invention.

What is claimed is:

1. An arrangement for variably dispersing light without deviation, comprising:
   a first prism including first and second aperture regions which are angled with respect to each other at a predetermined prism apex angle, said first prism having a first index of refraction,
   a second prism including third and fourth aperture regions which are angled with respect to each other at substantially the same prism apex angle, said second prism having a second index of refraction which substantially matches said first index of refraction, said second prism being axially rotatably mounted with respect to said first prism, and said first and fourth aperture regions facing away from each other and being generally parallel to each other, and a liquid containment structure for mounting said first and second prisms in alignment along a common optical axis, said liquid containment structure holding a selected liquid between said second and third aperture regions, which substantially refractively matches said first and second prisms and is substantially different in dispersion.

2. A method for variably dispersing light in a limited deviation optical system including a pair of prisms secured along a common optic axis and having respective apex angles $\alpha_1$ and $\alpha_3$ and respective indices of refraction $N_{D1}$ and $N_{D3}$, the respective prisms of said pair having generally oppositely directed outer faces and inner faces being rotationally settable between maximum and minimum relative values of a relative facial angle of said inner faces, $\alpha_2$, varying between boundary angles $\alpha_{2max}$ and $\alpha_{2min}$ and having a selected liquid contained therebetween having a refractive index $N_{D2}$, and having dispersion characteristics different from the dispersion characteristics of said pair of prisms, comprising the steps of:

directing said pair of prisms at a selected image, and setting a selected dispersion level by rotating one of said refractively matched prisms about the common optic axis and with respect to the other of said coaxial prisms, while maintaining a predetermined constant deviation according to the relationship:

$$D = \sum_{i}^{3} \alpha(N_{Di} - 1)$$

wherein i is an integer ranging from 1 to 3, and D represents the level of constant deviation.

* * * * *